INVENTOR
Russell Pearce Heuer.
BY
ATTORNEYS

July 3, 1956

R. P. HEUER 2,753,171

OPEN HEARTH STEEL FURNACE

Filed Aug. 31, 1951

INVENTOR
Russell Pearce Heuer.

BY

July 3, 1956

R. P. HEUER 2,753,171

OPEN HEARTH STEEL FURNACE

Filed Aug. 31, 1951

INVENTOR
Russell Pearce Heuer.
BY
ATTORNEYS

United States Patent Office 2,753,171
Patented July 3, 1956

2,753,171

OPEN HEARTH STEEL FURNACE

Russell Pearce Heuer, Villa Nova, Pa., assignor to General Refractories Company, a corporation of Pennsylvania Application August 31, 1951, Serial No. 244,603

4 Claims. (Cl. 263—45)

The present invention relates to open hearth steel furnaces and particularly to the constructions of uptakes, slag pockets and division assemblies or dog houses thereof.

A purpose of the invention is to simplify and facilitate the removal of foreign matter from the slag pocket and avoid or minimize the slagging of refractory brick in the uptakes which increases and causes fusion of the deposits in the slag pocket.

A further purpose is to render the uptakes and the roof of the slag pocket more resistant to temperature and to permit operation of the furnace at higher temperatures particularly in these locations.

A further purpose is to reduce the tendency of flue dust to form accretions in the uptakes.

A further purpose is to reduce the mass of the refractory required at the ends of the furnace.

A further purpose is to reduce the load on the structural steel members supporting the end of the furnace.

A further purpose is to assure more rapid flow of intake and discharge gases in the uptakes.

A further purpose is to construct the air uptakes in an open hearth furnace of restricted cross sectional area where the furnace is fired with fluid fuel such as fuel oil, tar pitch, natural gas or any unpreheated gas by manufacturing the uptakes and the roof on the slag pocket from nonacid or basic refractories which are suspended or individually mechanically supported to maintain the restricted uptake dimensions more readily and consistently.

A further purpose is to improve the construction of both air uptakes and gas uptakes when preheated fuel gas is used and double regenerator chambers are necessary by the use of suspended nonacid or basic refractory construction on the roof of the slag pocket, the lower portions of the uptakes and the lower portion of the dog house.

A further purpose is to produce an open hearth steel furnace having dual air uptakes at each end of the furnace with restricted minimum cross sectional area at each end totaling between 0.010 and 0.045 times the horizontal area of the furnace hearth (measured at the fore plate level) by using suspended refractory to integrate the stress pattern between the slag pocket roof and the adjoining wall or walls of the uptake. The fore plate level is shown in Bartu U. S. Patent 2,704,660, dated March 22, 1955, for Liquid Fuel Fired Open Hearth Furnaces, particularly Figure 6.

A further purpose is to improve the support of the roof of the slag pocket, of the uptakes and of the dog house.

A further purpose is to render the division assembly or dog house more accessible for construction and repair.

A further purpose is to provide a suspended division assembly between the dual uptakes to permit the integration of the stress pattern between the slag pocket roof and the intersecting uptake wall.

A further purpose is to suspend the lower portion of the dog house from nonacid or basic refractory brick and to support the upper portion of the dog house on the lower portion.

A further purpose is to obtain a more efficient stress distribution in the roof of the slag pocket, the lower portion of the uptake and the merging angle between the two.

A further purpose is to avoid the weakness previously existing in the sprung arch type roof of the slag pocket due to the necessity of providing an opening or openings at a position where structure would be desirable from the standpoint of strength.

A further purpose is to provide a suspended basic refractory roof on the slag pocket, desirably a flat construction, and merging at a suspended basic nose with suspended basic lower uptake walls, which suitably converge.

A further purpose is to separate the upper and lower refractory walls of the uptake and to interpose an expansion joint between the upper and lower walls.

A further purpose is to extend the suspended slag pocket roof to join the regenerator roof.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1:
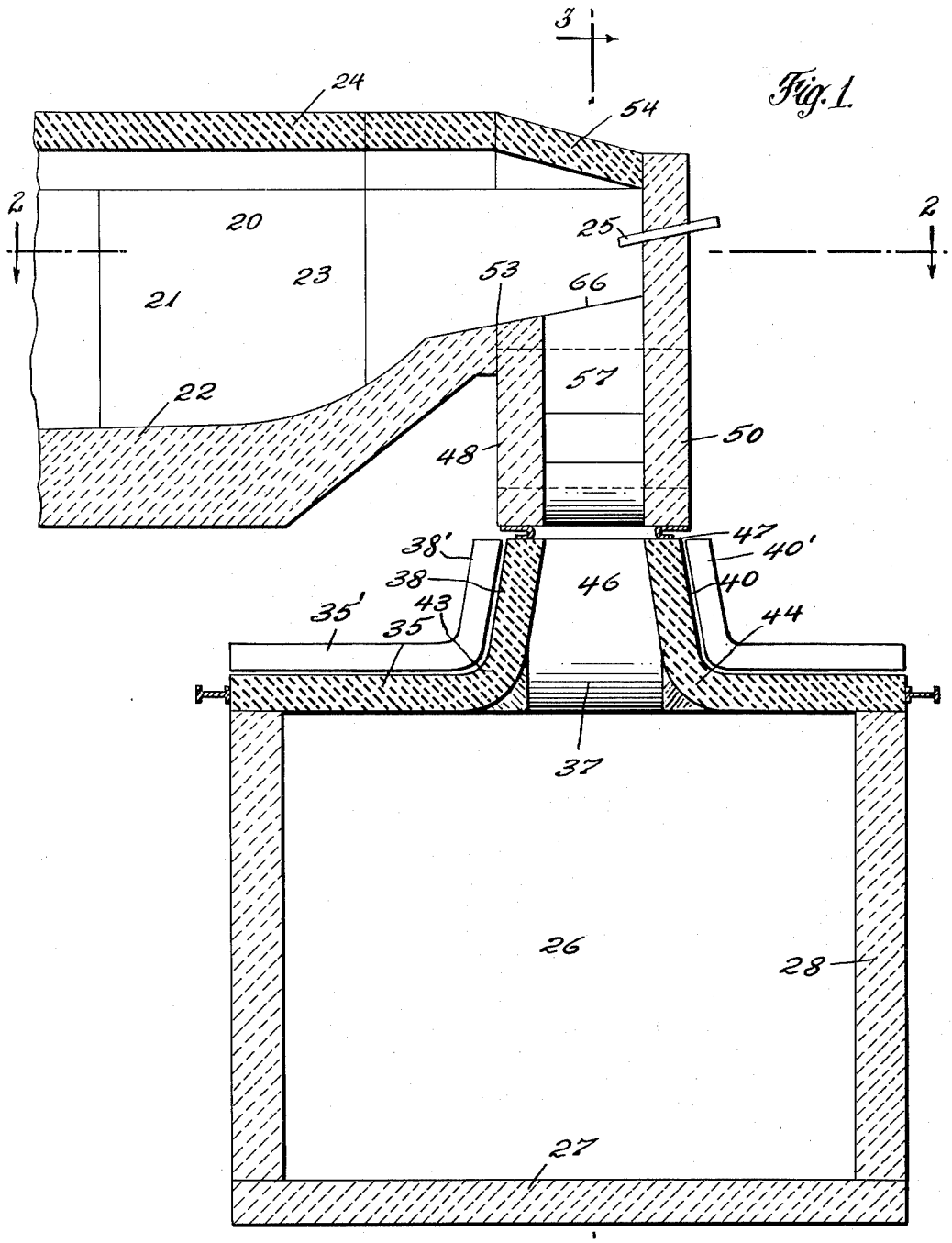
Figure 1 is a fragmentary longitudinal vertical section of an open hearth furnace, and the slag pocket and uptake embodying the invention, the section being taken on the line 1—1 of Figure 3.

In the drawings, to simplify the illustration, conventional refractory brick have been shown by light cross hatching and suspended refractory brick have been shown by heavy cross hatching, thus avoiding the necessity of showing the steel work from which the suspension is accomplished and the hangers connecting the individual brick thereof, all of which are well known in the art.

Describing in illustration but not in limitation and referring to the drawings:

In the prior art, in construction of open hearth steel furnaces, the uptakes have been made from acid refractories. Acid refractory brick have particularly been used because of the heavy loads which must be supported, and the comparatively greater load carrying capacities of such brick. As the temperatures attained are high and close to the upper working limits of commercial acid refractories, the practice has been to make the end construction very large, heavy and massive so that cooling will be provided for the brick exposed to the hot gases by the great mass of adjoining refractory.

In the construction of the slag pocket of such prior art furnaces, the dual branches of the uptake at a particular end of the furnace have been separated by a large solid masonry division assembly or dog house, and the limits of the perimeter of the uptakes have been as large as the area of the slag pocket, so that no roof whatever has been required for the slag pocket.

Since the flue gases of the open hearth contain slagging dust such as iron oxide which slags with the acid refractory, the acid refractory of the uptakes has undergone destruction by fluxing, and deposit of a flux mass in the slag pocket. Accordingly an accumulation has occurred in the slag pocket of a fused mass made up partly of a deposit of flue dust and partly from the refractory, fused together. The deposit has been so hard and coherent that the prior art practice in emptying the slag pocket has been to break up the deposits by explosives.

An effort was made by the present inventor to improve this construction by following the general outline of the large uptake cross section, but reducing the thickness of the walls and employing basic masonry construction. The resultant open hearth furnace was excessively high in fuel consumption, apparently because heat was not well retained by the furnace, and a great deal of heat unnecessarily was carried into the checkers.

The Maerz furnace, recently developed in Europe, employs two small uptakes in the corners of each end of the furnace, and a substantially complete sprung arch of acid refractories across the top of the slag pocket, with two uptake openings in the sprung arch. I find that this construction is complicated and expensive to build and has the great disadvantage that the uptake openings weaken the sprung arch at vital points and greatly increase the load applied on other elements of the sprung arch. The smallness of the uptakes in the Maerz type furnace creates the problem of providing a roof for the slag pocket, whereas formerly with the very large uptakes used in prior art open hearth furnaces the uptakes occupied the entire slag pocket area and no roof was required.

The great load carrying requirements of the sprung arch in the roof of the slag pocket of the Maerz furnace has necessitated the use of acid refractory brick in this arch. The arch has given comparatively short service and has been difficult to construct and repair. The presence of the uptake openings in the arch has raised problems in supporting the arch during construction which otherwise would not exist.

In accordance with the present invention, the comparatively small uptake openings and the rapid gas flow characteristic of the Maerz furnace are employed, the total minimum cross section of the uptakes at a given end of the furnace being between 0.010 and 0.045 times the hearth area at the fore plate level.

The roof of the slag pocket is suspended according to the present invention, and since the load on individual brick is greatly reduced, the individual brick employed will be nonacid or basic refractory brick.

The merging portion of the uptake which joins the roof of the slag pocket is formed from a suspended basic refractory brick nose, and the lower portion of the uptake is likewise made from suspended brick which will very desirably be basic refractory brick.

Thus a very desirable force distribution is obtained throughout the lower portion of the uptake and the roof of the slag pocket.

The upper portion of the uptake is desirably separated from the lower portion, and made from basic refractory brick of normal wall construction. Since the load is greatly reduced, basic refractory brick can be used at this point. Between the lower suspended construction and the upper normal wall construction, an expansion joint is desirably interposed, permitting relative adjustment.

It is important to keep the cross section of the uptakes constant, and I find that this can be done by using a character of basic refractory brick (high in magnesia) which do not favor building up of accretions.

The roof of the slag pocket may be made flat, avoiding extra space in the area where the slag pocket merges with the uptake.

This suspended roof on the slag pocket is desirably extended in the direction of the regenerator to merge with the regenerator roof. In the prior art practice, the dog house has been of solid masonry construction, very heavy, difficult to build and difficult to repair. In accordance with the improved construction of the present invention, the lower portion of the dog house is of suspended basic refractory brick, and the upper portion of the dog house is made of a normal wall construction of basic refractory brick, which can be used since the loads are greatly reduced.

The improvements just referred to result in a number of advantages. Since acid refractory brick is no longer present in the uptakes, the flue dust is no longer fluxed and the flue dust does not slag with the refractory and cause slagging destruction of the refractory. Thus the life of the refractory is greatly increased by the avoidance of slagging.

Since no appreciable slagging of the flue dust occurs, the deposit in the slag pocket in accordance with the present invention is a granular mass which can be removed by raking or shoveling. The total volume of the desposit is also reduced since the mass is not augmented by fluxed refractory. The lack of coherence of the deposit in the slag pocket completely avoids the necessity of using explosives to remove it.

The construction is greatly facilitated in accordance with the present invention since individual bricks are suspended and it is no longer necessary to provide temporary supports during the construction of a sprung arch.

The dog house can be build first at a time when its components are readily accessible and the uptake walls can be assembled around the dog house later. This greatly facilitates the construction of the dog house which under the old construction procedure required building of the uptake to support the dog house below the same and then building the dog house as an arch from the lower portions of the uptake.

The smallness of the uptakes and the greatly reduced thickness of the walls made possible by the use of suspended basic refractory brick and the avoidance of need of massiveness for cooling, greatly reduce the total weight of the end of the furnace so that the entire structural steel load is reduced and lighter foundations may be employed.

The advantages of the restricted uptakes will be better understood by comparing the Maerz furnace with the prior art practice in more detail.

In the construction of air uptakes for open hearth furnaces it has been customary to use the so-called Venturi construction. In order to provide proper gas flow from the air uptakes through the downward sloping Venturi port, the total minimum cross sectional area of the air uptakes has been about 0.10 times the area of the hearth measured at the foreplate level or more. The Maerz furnace has limited the use of the downward sloping Venturi port and as a result of the streamlined flow the total minimum cross sectional area of the air uptakes at a given end has been restricted to between 0.010 and 0.045 times the hearth area. This restricted area produces the desirable flame characteristically described and claimed in U. S. patent application Serial No. 209,865, filed February 7, 1951, by Bartu for Liquid Fuel Fired Open Hearth Furnaces and Process, Patent No. 2,704,660, granted March 22, 1955.

By restricting the area of the air uptakes in the Maerz furnace, the temperature of the air uptakes and the slag pocket is greatly increased. Thus the wear is increased on the refractory and silica brick (quite independently of the load carrying properties) is rendered unsatisfactory for the complete walls of the uptakes. The dust laden gases carry basic oxides such as iron oxide and possibly lime and other basic oxides which flux away the silica at the increased temperature. The melting away of the silica brick increases the area of the uptakes and the air velocity decreases and the flame characteristics change undesirably. Thus it is important to minimize the changes in dimension of the air uptakes in the Maerz furnace.

In the Maerz furnace the air uptakes communicate with the slag pocket by means of an uptake opening in the slag pocket arch. This arch must support itself and must support at least part of the weight of the uptake. The arch itself is weakened by the opening made through it. This coupled with the melting away of the refractories at the higher temperatures causes frequent furnace repairs.

The support of the slag pocket roof mechanically in accordance with the present invention and interrelating this construction into the air uptakes eliminates the undesirable stress patterns which formerly were created at the intersection of the horizontally supported slag pocket arch and the vertical air uptake. Both the air uptake brick and the slag pocket brick are individualy suspended from the steel work, and it is therefore possible to use basic refractories with lower mechanical strength and higher thermal expansion. Thus as already explained, I overcome the fluxing away which formerly destroyed the silicious brick and I avoid the cracking and spalling and mechanical failure which accompany the use of the basic brick at variable temperatures. In the preferred embodiment, as shown below, the slag pocket roof may be supported to form a flat roof as shown, and if desired the roof may be given more or less upward slope toward the air uptake opening. The air uptake walls are mechanically supported. At the intersection of the given uptake wall with a slag pocket roof a suspended radial nose construction is used to interrelate the horizontal stress pattern of the roof with the vertical stress pattern of the uptake. The two opposite walls of the uptake which are transverse to the longitudinal axis of the furnace require a nose construction except where the uptake is at the very edge of the slag pocket when only one nose is needed.

The uptake should conveniently be of rectangular cross section. There must be a separation between the uptakes to form two uptakes at each end of the furnace. In the Venturi ends which have commonly been used, the large uptake area is divided by an arch construction sprung across the end with its skew backs disposed longitudinally of the furnace axis. In the Maerz type furnace having restricted uptakes, the distance between the uptakes is much greater than in the Venturi type. Thus a much greater horizontal space between the uptakes must be closed. I adopt the practice of suspending bricks of the lower portion of this separator assembly or dog house from above, and supporting the upper portion of the separator assembly or dog house on the lower portion. The lower surface of the separator assembly may be horizontal as shown, or may slope up toward the uptakes. The separator assembly is preferably enclosed within the vertical uptake walls that lead to the radial nose.

It is preferable to locate the division assembly or dog house at a level entirely above the slag pocket roof nose so as to simplify the interrelation of the brick work. The interior of the divisional assembly unit is very desirably open at one end at least to the atmosphere for air cooling purposes.

The mechanical suspension of the bricks and the integration of the wall and roof structure makes it possible to use basic brick instead of silica brick in the uptake and in the roof of the slag pocket. The brick employed may, for example, be magnesite, chrome, chrome magnesite or magnesite chrome, of any well known type. I prefer to employ magnesite-chrome brick containing more magnesite than chrome. The best composition is 80 to 55 percent of dead burned magnesite and 20 to 45 percent of refractory chrome ore. Such brick are not physically as good as brick containing 65 percent chrome and 35 percent magnesite, but with the construction of the present invention it is possible to use brick of lower physical properties. The higher magnesite brick are advantageous since they do not build up accretions from iron oxide dust such as do the high chrome brick. The accretions forming on the high chrome brick are objectionable since they reduce the cross sectional areas of the uptakes and change the characteristics of the flame.

The brick used may be either burned or unburned.

The refractory brick to be used in the suspended roof portions are provided with suitable means to engage the hangers as well known. In unburned brick an insert recess can be formed according to the method described in my U. S. Patent No. 2,527,063. In the case of burned refractory brick, a recess or projection to engage the hanger is provided.

The hangers engage the brick at the cold end and connect to suitable castings or brackets connected to the main steel work, as well known in the art. Various forms of castings and hangers are well known and any such hanging construction may be used.

It is preferable to interpose oxidizable metallic spacer plates such as steel plates between the joints of the various refractory brick. If unburned refractory brick are used, these steel plates can be atached to the brick at the time they are formed in accordance with my U. S. Patent No. 2,289,911. If burned brick are used, the plates are attached to the brick after they are burned or loose plates or gauze or screening is inserted into the joints when the structure is assembled. The use of such metallic spacer elements between the supported basic brick forms a monolithic structure as shown in my U. S. Patent No. 2,547,322.

The invention will find utility particularly in furnaces burning liquid fuel such as oil, but also may be applied to furnaces burning gaseous fuel such as producer gas which requires preheating. In the specific form illustrated, fuel oil is contemplated, and no gas regenerator is shown. However, for furnaces requiring preheated gas fuel, a single conventional gas port would also be required at each end with a gas uptake leading to a slag pocket and gas regenerator. The construction of the uptake and slag pocket follows the same principles as described herein for the air uptakes and slag pocket. Where a single gas uptake is used no dog house is needed to divide the uptake.

Figure 2:
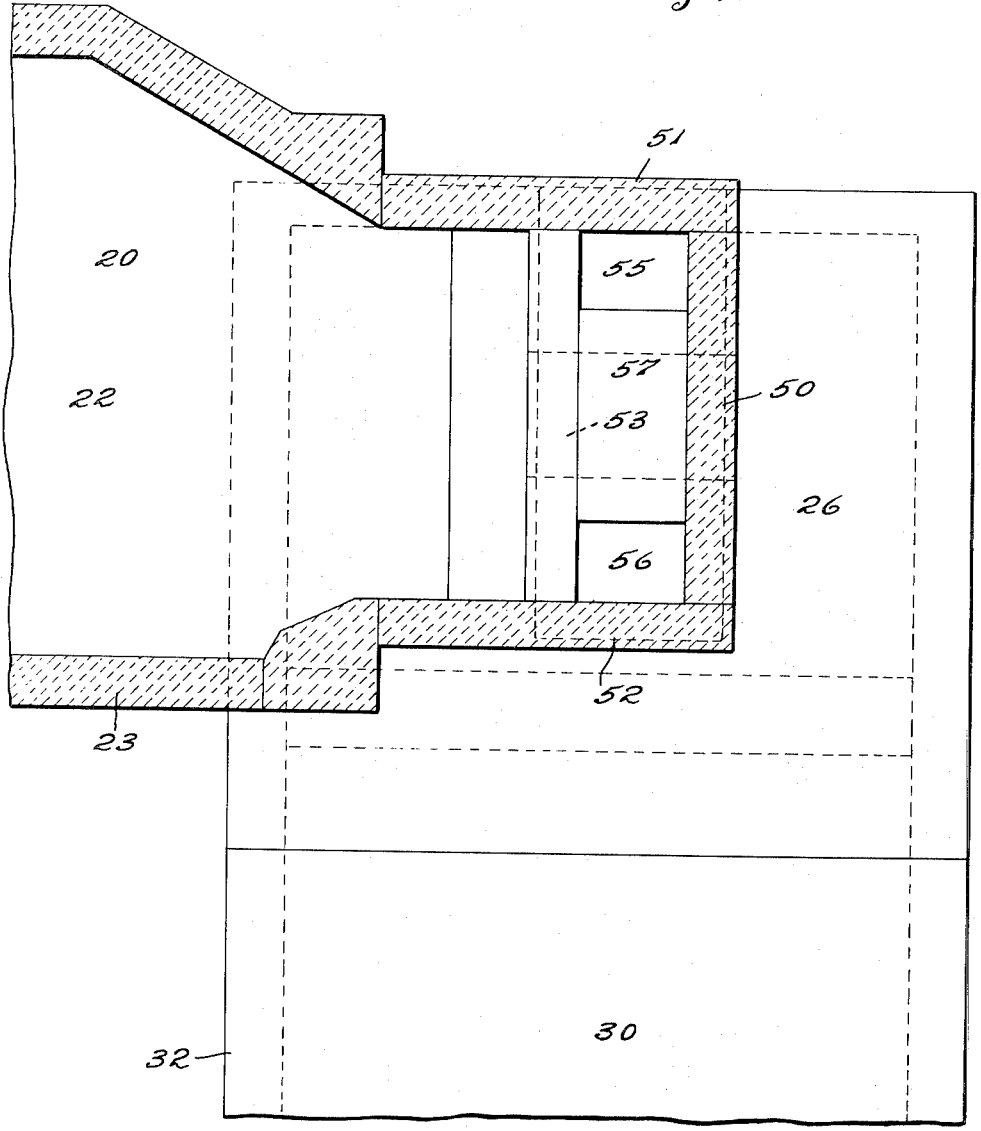
Figure 2 is a fragmentary horizontal section of Figure 1 on the line 2—2.
Figure 3:
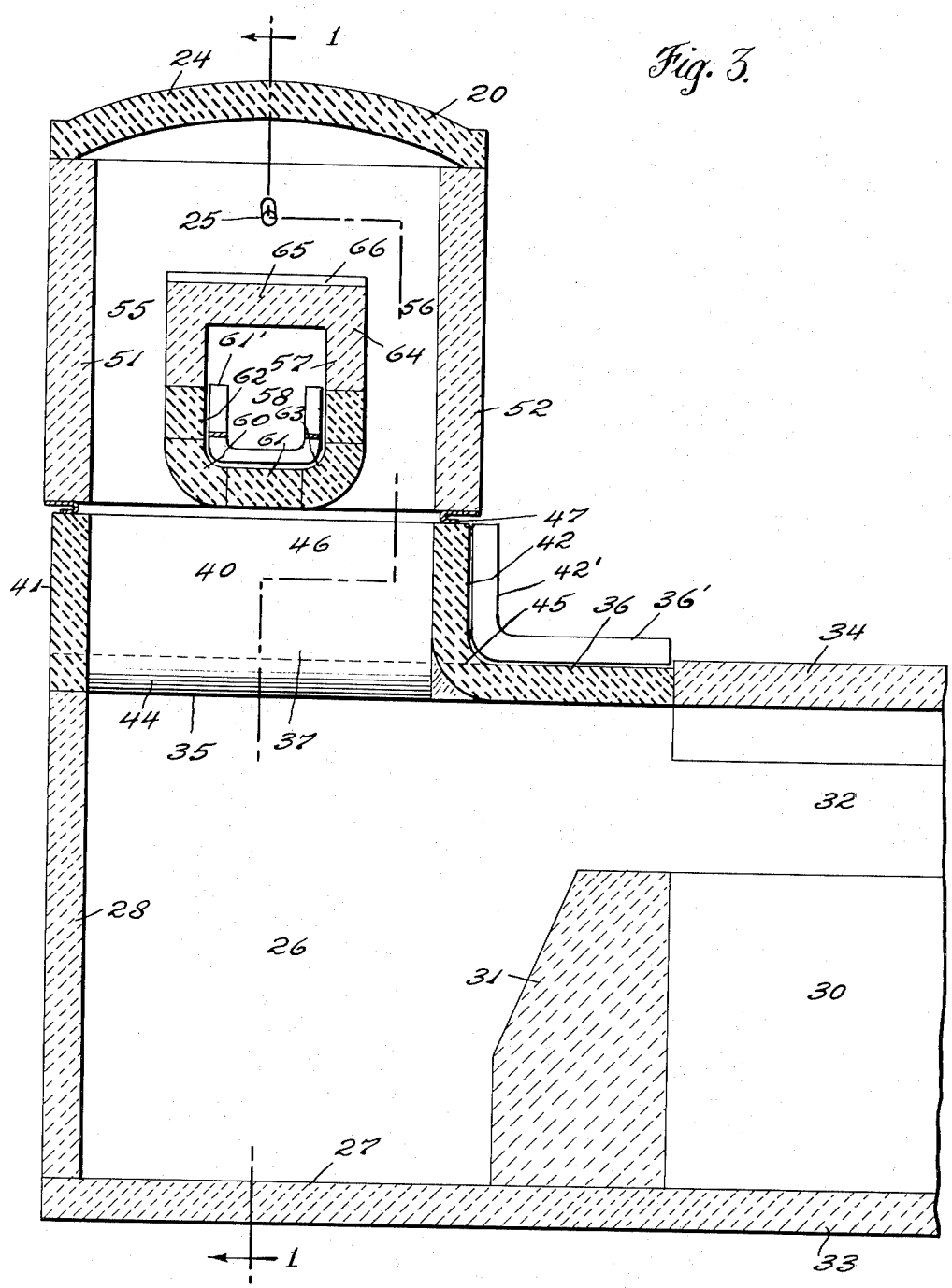
Figure 3 is a transverse vertical section of Figure 1 on the line 3—3.

Considering Figures 1, 2 and 3, I illustrate an open hearth furnace 20 having a furnace chamber 21, a hearth 22, front and back walls 23, and a roof 24, suitably of suspended basic refractory brick construction.

Only one end of the furnace is shown, and it will be understood that the opposite end will be an opposite counterpart. Any suitable fuel burner will be employed, of which the burner 25 is a conventional illustration.

Beneath the furnace is located a slag pocket 26, suitably of rectangular construction, and having a bottom wall 27, and side walls 28 on three sides. The refractory forming the bottom and side walls of the slag pocket will preferably be basic refractory brick as described, although if it is desired to substitute acid brick, this can be done at this point with less damage than at other points nearer the furnace because the temperatures in the slag pocket itself are somewhat lower than in the uptakes at the flue gas discharge end. Normal refractory wall construction will be used in building the slag pocket.

At the fourth side, the slag pocket connects with a regenerator 30 which may be of any desired character, having an entry bridge wall 31 at the bottom of the entering end, side walls 32, a bottom 33 and a roof 34, with any suitable heat absorbing material, not shown, placed to contact the hot gases and the air respectively.

At the top of the slag pocket and extending across the same, I provide a basic suspended furnace roof 35, which is preferably flat as shown, and has an extension 36 in prolongation of and merging with the roof 34 on the regenerator. Supporting steel work is diagrammatically shown at 35'. At a position beneath the end of the furnace I provide a generally rectangular uptake opening 37, and create the lower portion of the uptake by basic suspended refractory walls 38 and 40 converging together, and closed at the sides by walls 41 and 42. The transition from the flat roof 35 to converging suspended uptake walls 38 and 40 is accomplished by suspended basic refractory noses 43 and 44. The transition from uptake side wall 42 to slag pocket roof 36 is made by suspended refractory nose 45. Steel for support is shown diagrammatically at 38, 40' and 36' and 42'.

Up to the top of walls 38, 40, 41 and 42, the uptake forms a single passage 46 of generally rectangular form converging at the ends, and terminating in a suitable metallic expansion joint 47 which provides for an interconnection between the lower uptake portion and an upper uptake portion to be described. As well known in the art of building open hearth furnaces, the expansion joint 47 is suitably water cooled by means not shown and is suitably supported by the steel structure of the furnace (not shown) so that it provides an independent base on which to support the uptake walls above the expansion joint.

Above the expansion joint, the uptakes divide, and the outer limits are defined by base supported end walls 48 and 50 and front and back walls 51 and 52, suitably of basic refractory brick construction the front and back walls go all of the way up to the roof. End wall 48 terminates at the top to form part of the bridge wall 53 of the furnace and end wall 50 extends up to the top of the furnace and joins with the roof at a gradually upwardly inclined roof arch portion 54 which suitably makes an angle of between 95 and 135° with the vertical, to aid in carrying the flame wall out into the furnace and providing effective direction for the air rising through the uptakes as explained in the Bartu application above referred to.

The uptakes are separated into two passages 55 and 56 by a division assembly or dog house 57. Unlike the prior art construction, the dog house is not a solid masonry structure, but except for the supporting steel for the suspended bottom portion, has an open interior 58 which is exposed to the atmosphere at one and preferably at both ends through openings through the end walls 48 and 50. The dog house at the bottom has a basic refractory suspended portion 60 consisting of a suspended bottom portion 61, suspended side portions 62 and suspended nose portion 63, all supported from suitable steel work 61' in the space 57. By this independent support of the dog house, it will be evident that the dog house can be built by other parts of the uptake. The top of the dog house comprises conventional bottom supported basic refractory walls 64 and a top arch 65 supported thereon, the walls 64 and the arch 65 resting on the lower suspended portion 60.

The top arch portion 65 is suitably sloped toward the hearth at 66.

It will be evident that in accordance with the present invention, a very convenient economical and efficient construction has been developed for the end of an open hearth furnace.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. An open hearth steel furnace having an uptake of basic refractory brick on the inside, and a doghouse separating the uptake into two passages, said doghouse having a bottom supported basic refractory top portion and a suspended basic refractory lower portion in said uptake.

2. An open hearth steel furnace having a hearth, a slag pocket beneath the hearth, a suspended basic refractory roof on the slag pocket having an uptake opening, an uptake of basic refractory on the inside extending upward from said roof opening and forming a passage connecting said opening with an end of the furnace hearth, said uptake being divided into upper and lower vertical portions, said lower vertical portion having suspended basic refractory walls extending downward to said slag pocket roof and said lower vertical portion terminating short of said upper vertical portion, and a doghouse in said uptake separating the uptake into two passages, said doghouse having a bottom supported basic refractory arch spanning a suspended basic refractory lower portion.

3. An open hearth steel furnace having a hearth, and basic refractory brick appurtenances consisting of 80% to 55% dead burned magnesite and 20% to 45% refractory chrome ore as follows: a slag pocket of basic refractory brick on the inside beneath the hearth, a suspended basic refractory brick roof on the slag pocket having an uptake opening, an uptake of basic refractory brick on the inside extending upward from said roof opening and forming a passage connecting said opening with an end of the furnace hearth, the uptake having a total inside cross sectional area when measured at the minimum point of between 0.010 to 0.045 times the hearth area at the fore plate level and said uptake being divided into upper and lower vertical portions, said lower vertical portion having suspended basic refractory brick walls extending downward to said slag pocket roof and said lower vertical portion terminating short of said upper vertical portion, and a doghouse in said uptake separating the uptake into two passages, said doghouse having a bottom supported basic refractory brick arch spanning a suspended basic refractory brick lower portion.

4. An open hearth steel furnace having a hearth, a slag pocket beneath the hearth, a suspended basic refractory roof on the slag pocket having an uptake opening, an uptake of basic refractory on the inside extending upward from said roof opening and forming a passage connecting said opening with an end of the furnace hearth, said uptake being divided into upper and lower vertical portions, said lower vertical portion having suspended basic refractory walls extending downward to said slag pocket roof and said lower vertical portion terminating short of said upper vertical portion, and a pliable seal disposed between the opposed ends of said upper and lower vertical portions.

References Cited in the file of this patent

UNITED STATES PATENTS

| | | |
|---|---|---|
| 1,769,367 | Danforth | July 1, 1930 |
| 1,992,482 | Heuer | Feb. 26, 1935 |
| 2,328,917 | Longenecker | Sept. 7, 1943 |
| 2,339,233 | Hearing | Jan. 11, 1944 |
| 2,534,454 | Kay et al. | Dec. 19, 1950 |
| 2,548,908 | Pollen | Apr. 17, 1951 |
| 2,593,481 | Over | Apr. 22, 1952 |
| 2,671,732 | Birch et al. | Mar. 9, 1954 |
| 2,704,660 | Bartu | Mar. 22, 1955 |

OTHER REFERENCES

Pages 198–205 of Open-Hearth Furnaces, vol. II by Wm. C. Buell, Jr., published 1937 by the Penton Publ. Co., Cleveland, Ohio.

Pages 12, 13, 14 and 15 of Detrick "Furnace Enclosures" (copyright 1947, by M. H. Detrick Co.), a pamphlet published by the M. H. Detrick Co., 21 West St., zone 6, N. Y.

"Basic Ends and All-Basic Open Hearth Furnaces," pages 47–58 incl. of Iron and Steel Engineer, March 1948.

Basic Furnaces and Ends, pages 166–169 of Thirty-first National Open Hearth Conference by A. I. M. E., Pittsburgh, Pa., April 12–14, 1948.